Figure 1:
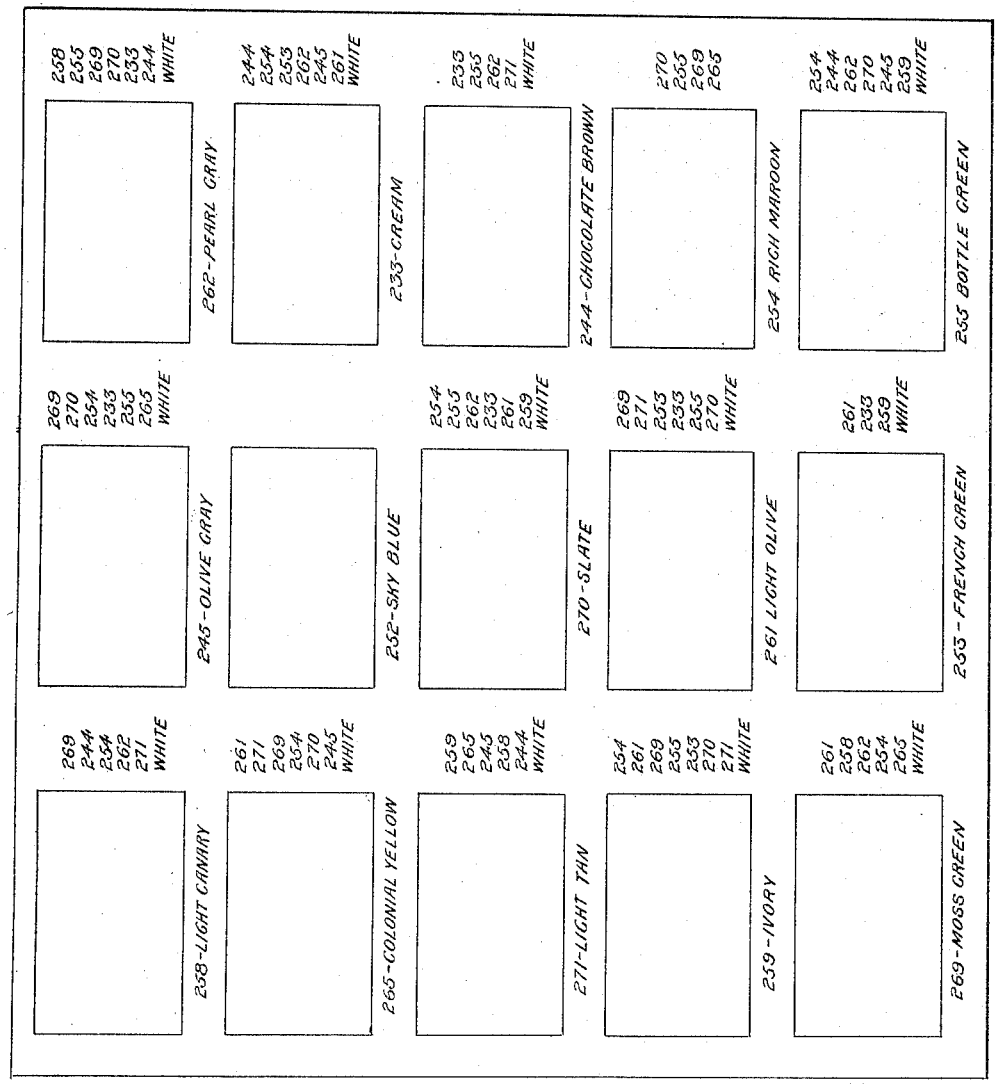

Sept. 16, 1924.

N. A. ROSS

COLOR CHART 1,508,988

Original Filed Sept. 16, 1919   2 Sheets—Sheet 1

Sept. 16, 1924.

N. A. ROSS

COLOR CHART 1,508,988

Original Filed Sept. 16, 1919    2 Sheets-Sheet 2

Fig. 2.

Witness

Edwin L. Bradford

Inventor

Norton A. Ross

By

Edward R. Alexander

Attorney

Patented Sept. 16, 1924.

1,508,988

UNITED STATES PATENT OFFICE.

NORTON A. ROSS, OF CLEVELAND, OHIO, ASSIGNOR TO THE PATTERSON-SARGENT COMPANY, OF CLEVELAND, OHIO, A CORPORATION OF OHIO.

COLOR CHART.

Application filed September 16, 1919, Serial No. 324,198. Renewed August 18, 1924.

*To all whom it may concern:*

Be it known that I, NORTON A. ROSS, a citizen of the United States, residing at Cleveland, in the county of Cuyahoga and State of Ohio, have invented certain new and useful Improvements in and Relating to Color Charts, of which the following is a specification.

The invention relates to color charts which are especially adapted for use in connection with color substances, such as paints.

The chief object of the invention is the provision of a set of color charts by means of which the selection and use of certain improved color substances originated by me can be greatly facilitated.

To permit of a clear understanding of my improved charts I will briefly explain the nature of the color substances with which the color charts are used. The invention is particularly applicable to ready-mixed paints including enamels, and for purposes of explanation and illustration, will be set forth in that connection.

For the sake of clearness in the description which follows, the color terminology employed will be in accordance with the following accepted scientific definitions:

1. By hue is meant the dominating wave length of the color.

2. By value, or strength, or intensity, or luminosity, or brightness, is meant the wave amplitude of the color.

3. By chroma or purity is meant freedom from admixture of wave lengths other than those constituting the dominating hue of the color.

My invention is based primarily upon the discovery, made in connection with the ready-mixed paint trade, that of the relatively large number of colors demanded by the consumer, a distinct minority meet the major part of the demand and that the colors constituting this minority are characterized by their relatively great brightness and purity, while on the other hand, the colors making up the larger or majority group are characterized by comparatively lower brightness and chroma qualities. This relation between the demands of color users and the nature of the colors is apparently based on the inherent color sense of the average user, the brighter and purer colors being demanded for the majority of uses in preference to those of lower brightness and chroma qualities.

In order to take advantage of the relation referred to, I provide a series of relatively pure bright paints, which I hereinafter refer to as primary paints adapted to meet the bulk of the trade demand and having such characteristics, physical and chemical, as to adapt them for intermixture in subgroups in definite proportions to produce a larger series of paints having lower brightness and purity or chroma values, which I hereinafter refer to as primary paints and which respond to the major part of the remainder of the demand of the trade. With these two series of paints, it is necessary for the paint manufacturer to produce and for the distributor to carry in stock only those of the smaller series or group, the paints of the larger group being produced by the simple admixture of certain of the paints of the smaller group. In order that the paints of the larger or secondary group may be produced from the primary paints of the smaller group as easily as possible by the consumer, I prefer that the relations of the colors of the two groups and of the physical and chemical characteristics of the paints of the smaller or primary group, shall be such that each of the secondary paints can be produced by the admixture of a plurality of the primary paints in equal amounts and, to make the process as simple as possible, I prefer that each secondary paint be produced by the admixture of two of the primary paints in equal amounts.

In carrying out my invention, I proceed as follows: Taking the colors which by experience are found to be demanded by the paint trade, I divide them into the two groups above referred to, one of which comprises a relatively small number of colors representing the major part of the trade demand and characterized by comparatively high chroma and brightness values while the other group comprises a larger number of colors representing the major part of the remainder of the trade demand and having lower chroma and brightness values. In practice I find that the trade demand is almost completely met by eighty colors supplemented by white and of this number fifteen of the colors and white fall in the smaller group of primary colors while the other sixty-five constitute the larger group.

I next prepare a series of paints having colors corresponding to the colors of the small group and having physical and chemical characteristics adapting them to mix without deleterious chemical reaction in certain subgroups, preferably in pairs, in uniform proportions, preferably equal proportions, to form in each case a paint having a color substantially the same as one of the colors of said larger group. And thereafter as need requires, the primary paints of the smaller group are mixed in the manner specified to produce the secondary paints of the larger group.

In the distribution of paints prepared as above described the dealer and user are provided with the special color charts to which the present invention more especially relates and preferred forms of which are shown in the accompanying drawings.

In the drawings, Fig. 1 represents a chart having a series of rectangular color panels corresponding to the primary paints of my system.

Fig. 2 represents another chart having a larger series of rectangular color panels corresponding to the secondary paints of my system.

The paints represented by the small group of panels in Fig. 1 are the ones produced by the manufacturer and carried in stock by the dealer, while the paints represented by the larger group of color panels are produced by mixing the proper primary paints. To facilitate the production of the secondary paints by the user or the distributor, I designate each of the primary paints by some symbol or identifying mark, preferably by a number as indicated in Fig. 1 of the drawing. Then each of the secondary colors is designated as shown in Fig. 2 by a legend made up of the symbols of those primary paints which when mixed in equal proportions produce said secondary paint.

Thus, if a purchaser selects paints from the secondary group, it is a very simple matter for the dealer to determine from the charts the necessary primary paints for the production of the secondary paints selected, and also a very simple matter for the purchaser on reference to the charts to mix the primary paints for the production of the secondary paints when the latter are required for use.

The charts can be prepared in any suitable manner, but I prefer to make the individual panels of painted or otherwise colored paper or the like and attach them to the card, sheet, board or the like which forms the body of the chart. Obviously each of the groups of colors can be put on a single card or on a plurality of cards, as may be desired. It will be obvious, too, that other variations of the charts as shown in the drawings can be made within the scope of the appended claims.

Paints of the character herein referred to, and the method of making them, are described and claimed in my co-pending application Serial No. 468,116, filed May 9th, 1921.

What I claim as my invention is:

1. The combination of color charts comprising a chart bearing a series of colored panels representing by their colors a series of primary color paints certain of which are combinable with each other to produce secondary paints having distinctive colors, said chart having identifying marks associated with said colored panels, and another chart bearing a series of colored panels representing by their colors the aforesaid secondary paints, the last named chart having associated with each of its colored panels a corresponding legend indicating by the use of said identifying marks the primary paints that are combinable to produce the secondary paint in question.

2. The combination of color charts comprising a chart bearing a series of colored panels representing by their colors a series of primary color paints certain of which are combinable in equal proportions with each other to produce secondary paints having distinctive colors, said chart having identifying marks associated with said colored panels, and another chart bearing a series of colored panels representing by their colors the aforesaid secondary paints, the last named chart having associated with each of its colored panels a corresponding legend indicating by the use of said identifying marks the primary paints that are combinable in equal proportions as aforesaid to produce the secondary paint in question.

3. The combination of color charts comprising a chart bearing a series of colored panels representing by their colors a series of primary color paints certain pairs of which are combinable with each other to produce secondary paints having distinctive colors, said chart having identifying marks associated with said colored panels, and another chart bearing a series of colored panels representing by their colors the aforesaid secondary paints, the last named chart having associated with each of its colored panels a corresponding legend indicating by the use of said identifying marks the two primary paints combinable to produce the secondary paint in question.

4. The combination of color charts comprising a chart bearing a series of colored panels representing by their colors a series of primary color paints certain pairs of which are combinable in equal volumes with each other to produce secondary paints having distinctive colors, said chart having identifying marks associated with said colored panels, and another chart bearing a series of colored panels representing by their colors the aforesaid secondary paints, the last named chart having associated with each of its colored panels a corresponding legend indicating by the use of said identifying marks the two primary paints combinable in equal volumes as aforesaid to produce the secondary paint in question.

In testimony whereof I affix my signature, in the presence of two witnesses.

NORTON A. ROSS.

Witnesses:
JOSEPH K. RAMEN,
J. B. GIBNEY.